(12) United States Patent
Hamano

(10) Patent No.: US 11,106,956 B2
(45) Date of Patent: Aug. 31, 2021

(54) IMAGE FORMING APPARATUS AND METHOD OF CONTROLLING IMAGE FORMING APPARATUS WITH AMPLIFIER GAIN CONTROL

(71) Applicant: SEIKO EPSON CORPORATION, Tokyo (JP)

(72) Inventor: Yusuke Hamano, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 16/832,950

(22) Filed: Mar. 27, 2020

(65) Prior Publication Data
US 2020/0311501 A1 Oct. 1, 2020

(30) Foreign Application Priority Data
Apr. 1, 2019 (JP) .............................. JP2019-070160

(51) Int. Cl.
*G06K 15/00* (2006.01)
*H04B 3/06* (2006.01)

(52) U.S. Cl.
CPC ..... *G06K 15/4045* (2013.01); *G06K 15/4025* (2013.01); *H04B 3/06* (2013.01)

(58) Field of Classification Search
CPC .. G06K 15/4045; G06K 15/4025; H04B 3/06; B41J 2/00
See application file for complete search history.

(56) References Cited

U.S. PATENT DOCUMENTS

| 2003/0072501 A1* | 4/2003 | Enomoto | G06K 9/40 382/311 |
| 2006/0091216 A1* | 5/2006 | Page | G06K 9/6814 235/462.07 |
| 2017/0232765 A1* | 8/2017 | Moriyama | B41J 2/01 347/16 |

FOREIGN PATENT DOCUMENTS

JP 2010-239326 10/2010

* cited by examiner

*Primary Examiner* — Juan M Guillermety
(74) *Attorney, Agent, or Firm* — Workman Nydegger

(57) ABSTRACT

An image forming apparatus includes: a transceiver circuit configured to transmit a signal. A carriage having a recording head is movable relative to the transceiver circuit. A counter counts how many times the carriage moves. An amplifier circuit mounted on the carriage receives the signal from the transceiver circuit through a cable and amplifies the received signal. A carriage controller changes a gain of the amplifier circuit, based on a count value of the counter.

9 Claims, 4 Drawing Sheets

IMAGE FORMING APPARATUS AND METHOD OF CONTROLLING IMAGE FORMING APPARATUS WITH AMPLIFIER GAIN CONTROL

The present application is based on, and claims priority from JP Application Serial Number 2019-070160, filed Apr. 1, 2019, the disclosure of which is hereby incorporated by reference herein in its entirety.

BACKGROUND

1. Technical Field

The present disclosure relates to an image forming apparatus in which signals are transmitted through a cable and further relates to a method of controlling the image forming apparatus.

2. Related Art

JP-A-2010-239326 discloses an equalizer that amplifies a signal that has been attenuated through a transmission path.

If the transmission path is a cable, its attenuation characteristics may vary owing to continuous bending and stretching. Herein, the attenuation characteristics of the cable indicate the degree to which a signal is attenuated when it is transmitted through the cable. Known equalizers, as described above, may fail to consider such varying attenuation characteristics of the cable when amplifying a signal transmitted through a cable.

SUMMARY

The present disclosure is an image forming apparatus, which includes: a transceiver circuit configured to transmit a signal; a carriage having a recording head which is movable; a counter configured to count how many times the carriage moves; an amplifier circuit mounted on the carriage which receives the signal from the transceiver circuit through a cable and amplifies the received signal; and a processor configured to change a gain of the amplifier circuit, based on a count value of the counter.

The present disclosure is a method of controlling an image forming apparatus. The image forming apparatus includes: a transceiver circuit configured to transmit a signal; a carriage having a recording head which is movable; a counter configured to count how many times the carriage moves; and an amplifier circuit mounted on the carriage which receives the signal from the transceiver circuit through a cable and amplifies the received signal. The method includes changing a gain of the amplifier circuit, based on a count value of the counter.

DESCRIPTION OF EXEMPLARY EMBODIMENTS

Figure 1:
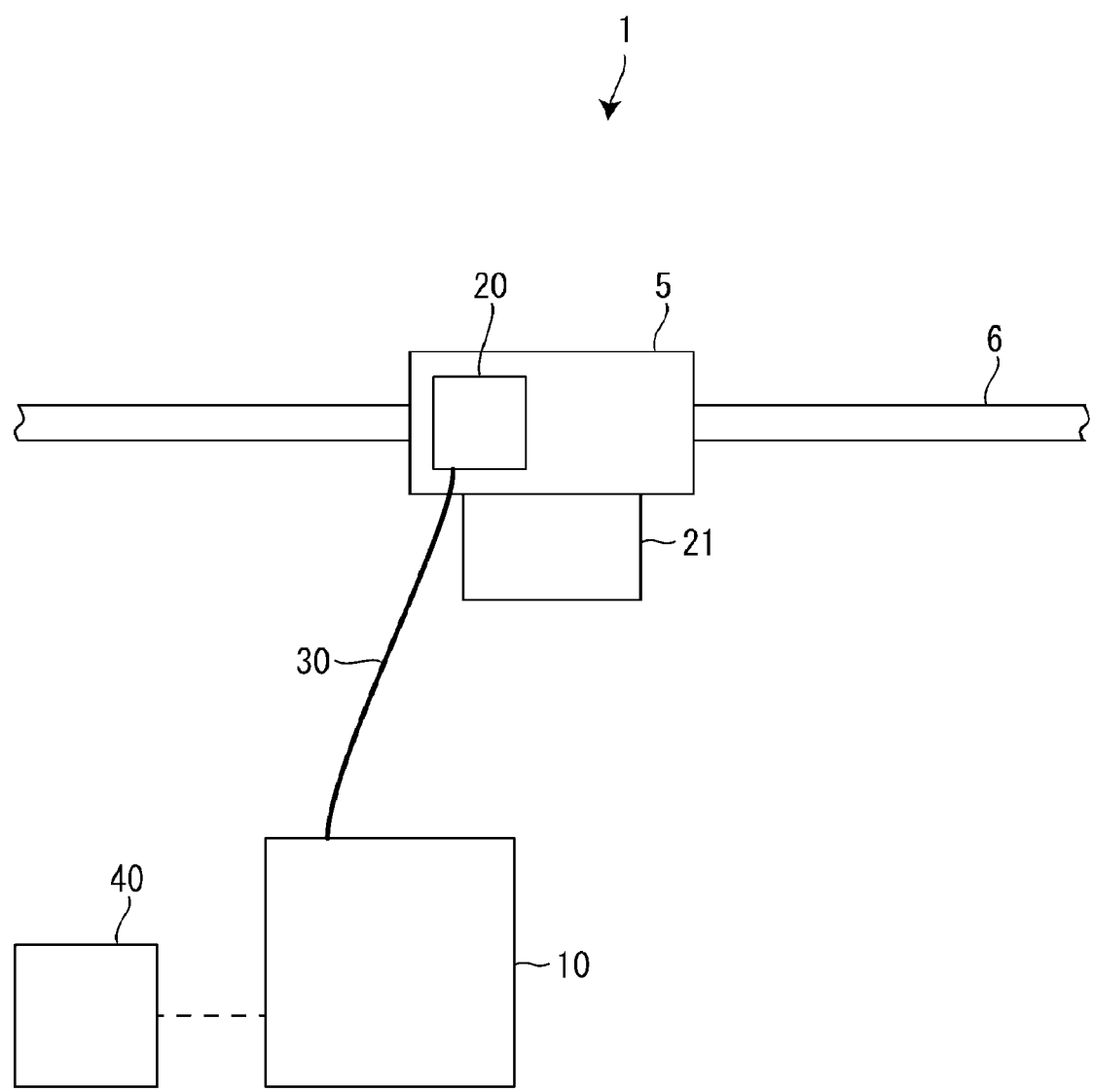
FIG. 1 illustrates a configuration of an image forming apparatus according to an embodiment of the present disclosure.

With reference to the accompanying drawings, a description will be given below of an image forming apparatus 1 and a method of controlling the image forming apparatus 1. As illustrated in FIG. 1, the image forming apparatus 1 includes a carriage 5, a main substrate 10, a carriage substrate 20, a cable 30, and a carriage motor 40. Herein, the main substrate 10 is an example of a "first substrate", and the carriage substrate 20 is an example of a "second substrate".

Mounted on the carriage 5 is a recording head 21, which may be an ink jet or other type of recording head. The carriage motor 40 drives the carriage 5 so as to reciprocate along a carriage guide 6. When the carriage 5 reciprocates, the recording head 21 mounted on the carriage 5 also reciprocates relative to a print medium.

The main substrate 10 is mounted in the image forming apparatus 1 separately from the carriage 5. Thus, the main substrate 10 is stationary even when the carriage 5 moves. The carriage substrate 20 is mounted in the carriage 5 together with the recording head 21. The cable 30 couples the main substrate 10 to the carriage substrate 20. Examples of the cable 30 include, but are not limited to, a flexible flat cable, a flexible printed circuit (FPC) board, a universal serial bus (USB) cable, a local area network (LAN) cable, and other types of metal cables.

Figure 2:
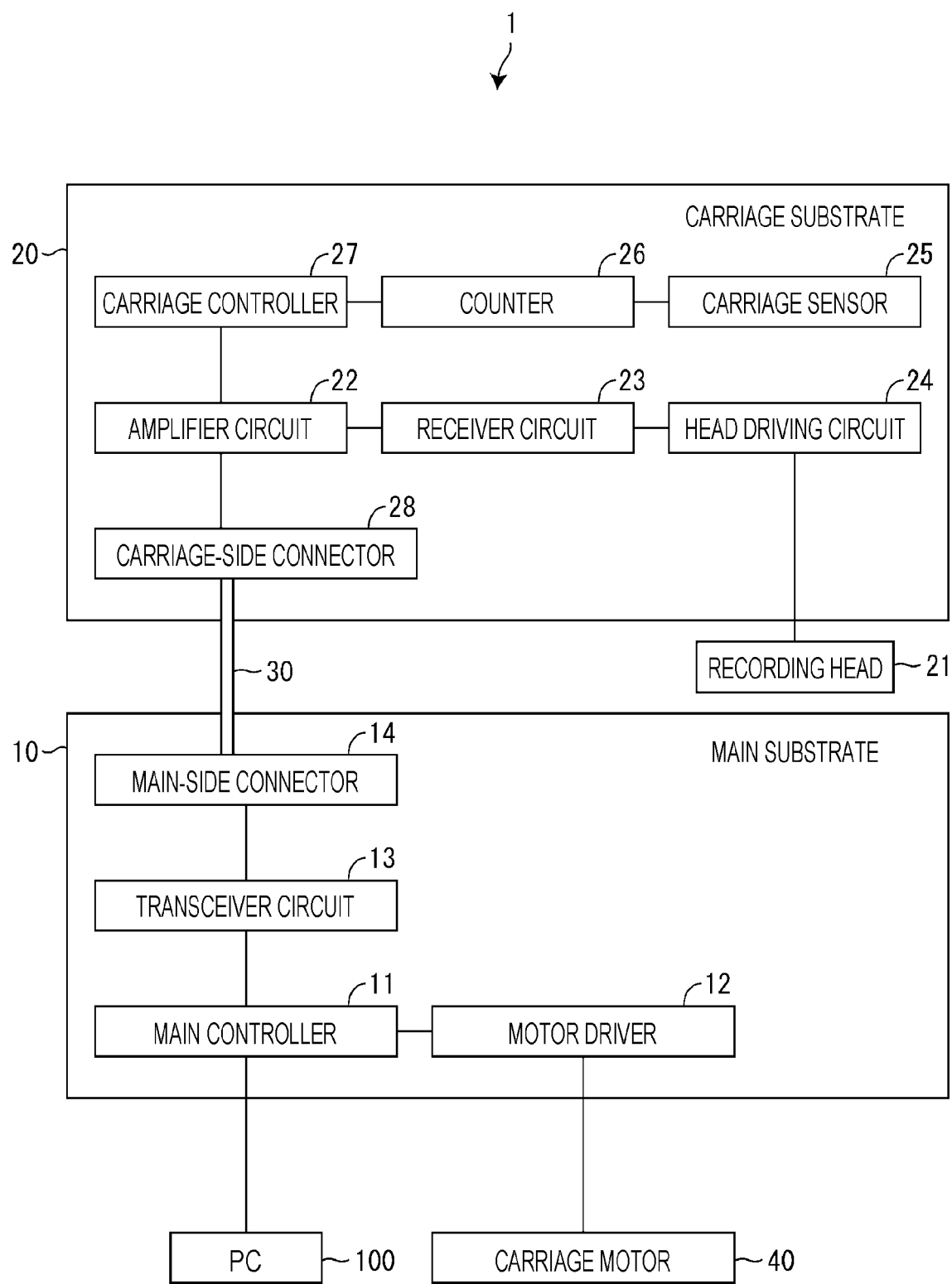
FIG. 2 is a block diagram of configurations of the main substrate and the carriage substrate in the image forming apparatus.

As illustrated in FIG. 2, the main substrate 10 includes a main controller 11, a motor driver 12, a transceiver circuit 13, and a main-side connector 14.

The main controller 11 controls individual components in the image forming apparatus 1 in an integrated manner. The main controller 11 includes: a processor such as a central processing unit (CPU); and various memories such as random access memory (RAM) and read only memory (ROM). The motor driver 12 drives the carriage motor 40. The transceiver circuit 13 receives or obtains an image signal (picture signal) to be used by the recording head 21 to perform a print operation and then converts this image signal into a transmission signal that can be transmitted over a long distance. Examples of the image signal include, but are not limited to, a red, green, and blue (RGB) signal and a cyan, magenta, yellow, and black (CMYK) signal. The RGB signal may be received from a personal computer (PC) 100 or other external device; the CMYK signal may be obtained by subjecting the RGB signal to color conversion. The transmission signal may conform to a predetermined specification, such as peripheral component interconnect-express (PCIe), USB, and Ethernet™. The cable 30 is coupled at its input end to the main-side connector 14.

The carriage substrate 20 includes an amplifier circuit 22, a receiver circuit 23, a head driving circuit 24, a carriage sensor 25, a counter 26, a carriage controller 27, and a carriage-side connector 28.

The amplifier circuit 22 receives the transmission signal from the transceiver circuit 13 through the cable 30 and then amplifies this transmission signal. In this case, the amplifier circuit 22 compensates for the high-frequency property of the transmission signal, because high-frequency components of the transmission signal tend to be attenuated more than low-frequency components when the transmission signal is transmitted through the cable 30. In this embodiment, the carriage controller 27 changes a gain of the amplifier circuit 22 in multiple steps, based on the number of times that the carriage 5 moves; details of this will be described later.

After the amplifier circuit 22 has amplified the transmission signal, the receiver circuit 23 converts this transmission signal into the image signal. Then, based on this image signal, the head driving circuit 24 drives the recording head 21.

The carriage sensor 25, which may be an optical sensor, for example, detects the movement of the carriage 5 and then generates a detection signal based on the detection result. The counter 26 receives the detection signal from the carriage sensor 25 and then counts how many times the carriage 5 moves, based on the detection signal. At one or both edges of the range over which the carriage 5 reciprocates are light shields. While the carriage 5 is moving, the carriage sensor 25 detects the presence of the light shields and generates the detection signal. The counter 26 continues to count how many times the carriage 5 moves ever since the image forming apparatus 1 started up and sets its count value to the number of times counted. However, the counter 26 resets the count value to zero when the cable 30 is replaced with another. Instead of the counter 26, the processor in the main controller 11 may count how many times the carriage 5 moves. In this case, the processor may detect a control signal to be transmitted to the carriage motor 40, for example.

Based on the count value received from the counter 26, the carriage controller 27 changes the gain of the amplifier circuit 22. The carriage controller 27 includes a processor such as a CPU and various memories such as RAM and ROM. The cable 30 is coupled at its output end to the carriage-side connector 28.

When the image forming apparatus 1 configured above performs the print operation, the carriage 5 moves along the carriage guide 6. As a result, the carriage substrate 20 mounted on the carriage 5 moves relative to the main substrate 10, and thus the amplifier circuit 22 formed on the carriage substrate 20 moves relative to the transceiver circuit 13 formed on the main substrate 10. In this case, the cable 30 that couples the main substrate 10 to the carriage substrate 20 is bent or stretched in response to the movement of the carriage 5. Owing to the bending and stretching, the attenuation characteristics of the cable 30 may deteriorate. As a result, the signal transmitted through the cable 30 may be further attenuated.

Figure 3:
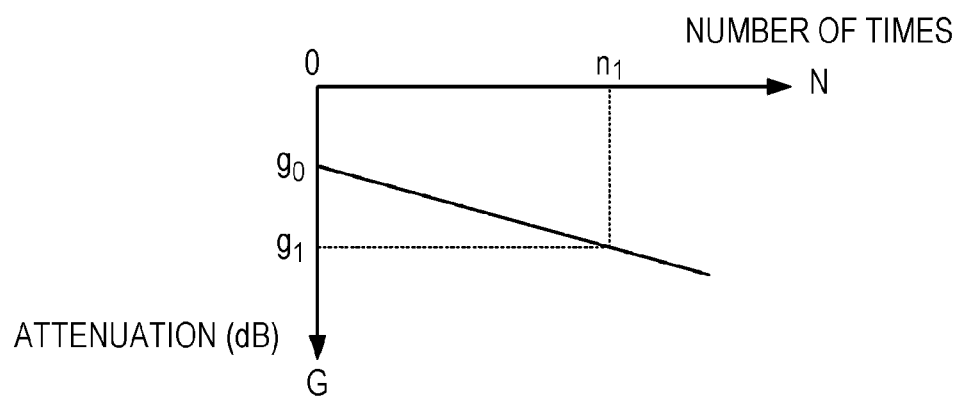
FIG. 3 is a graph illustrating the relationship between the number of times that the carriage moves and the attenuation characteristics of the cable.

As illustrated in FIG. 3, the attenuation characteristics of the cable 30 deteriorate in proportion to the number of times that the carriage 5 moves. For example, when the number of times N is zero, an attenuation G of the cable 30 becomes $g_0$, which is an initial value. When the number of times N increases to $n_1$, the attenuation G also increases to $g_1$ ($>g_0$).

Suppose the carriage controller 27 sets the gain of the amplifier circuit 22 to a value suitable for the case where the attenuation G is $g_0$ (N=0). Then, when the carriage controller 27 maintains the gain at this value, the receiver circuit 23 may mistakenly recognize the high level of a signal as the low level. This is because the amplified level of the transmission signal decreases as the number of times N increases. On the other hand, suppose the carriage controller 27 sets the gain of the amplifier circuit 22 to a value suitable for the case where the attenuation G is $g_1$ (N=$n_1$). When the carriage controller 27 maintains the gain at this value, the amplified transmission signal may exceed an allowable level of the receiver circuit 23 and damage some elements in the receiver circuit 23. This is because the gain might become excessively high when the number of times N is less than $n_1$.

In this embodiment, when the number of times that carriage 5 moves, which is detected by both the carriage sensor 25 and the counter 26, exceeds a predetermined threshold, the carriage controller 27 increases the gain of the amplifier circuit 22.

Figure 4:
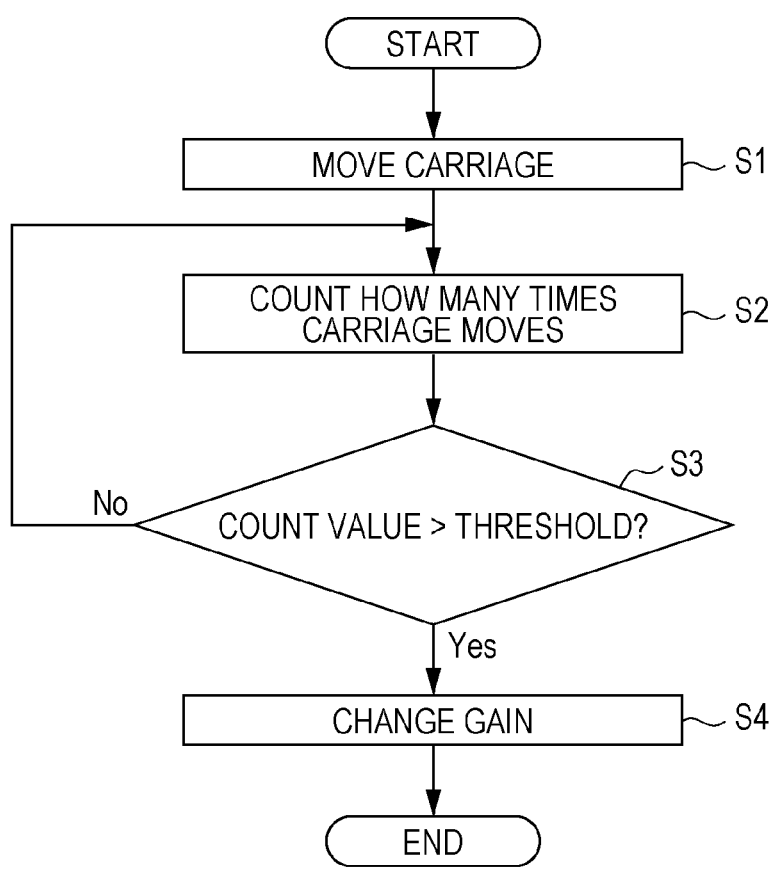
FIG. 4 is a flowchart of a process of controlling the image forming apparatus.

FIG. 4 is a flowchart of a process of controlling the image forming apparatus 1. This process is performed when the processor in the carriage controller 27 reads a control program from the ROM and executes this control program on the RAM. However, the process may be performed by hardware resources alone.

At Step S1, the carriage controller 27 causes the carriage motor 40 to move the carriage 5.

At Step S2, the carriage controller 27 causes the counter 26 to count how many times the carriage 5 moves and sets its count value to the number of times counted.

At Step S3, the carriage controller 27 determines whether the count value of the counter 26 exceeds a predetermined threshold. When determining that the count value does not exceed the threshold (No at Step S3), the carriage controller 27 returns this processing to Step S2 and continues to count how many times the carriage 5 moves.

When determining that the count value exceeds the threshold (Yes at Step S3), the carriage controller 27 makes this processing proceed to Step S4 and then increases the gain of the amplifier circuit 22 by a predetermined value.

In an image forming apparatus 1 according to this embodiment, as described above, a counter 26 counts how many times a carriage 5 moves and sets its count value to the number of times counted. Then, a carriage controller 27 changes the gain of an amplifier circuit 22, based on the count value. In this way, the image forming apparatus 1 amplifies a signal transmitted through a cable 30 in accordance with varying attenuation characteristics of the cable 30.

It should be noted that the foregoing embodiment is not limited and can obviously employ various configurations within the scope of the present disclosure. The foregoing embodiment may be modified in the following manner.

The carriage controller 27 changes the gain of the amplifier circuit 22 in any number of steps, such as two, three, or more steps, based on the count value of the counter 26.

If the attenuation characteristics of the cable 30 are improved in proportion to the number of times that the carriage 5 moves, the carriage controller 27 may decrease the gain of the amplifier circuit 22 in proportion to the count value of the counter 26. It is obvious that the foregoing embodiment and modifications may be combined together.

An image forming apparatus 1 and a method of controlling the image forming apparatus 1 will be described below. An image forming apparatus 1 includes: a transceiver circuit 13 that transmits a signal; a carriage 5 having a recording head 21 which is movable relative to the transceiver circuit 13 and a main substrate 10 on which the transceiver circuit 13 is mounted; a counter 26 that counts how many times the carriage 5 moves; an amplifier circuit 22 mounted on the carriage 5 which receives the signal from the transceiver circuit 13 through the cable 30 and amplifies the received signal; and a carriage controller 27 that changes a gain of the amplifier circuit 22, based on a count value of the counter 26.

The above configuration successfully amplifies the signal transmitted through the cable 30 in accordance with varying attenuation characteristics of the cable 30.

The signal may be an image signal. The transceiver circuit 13 may convert the image signal into a transmission signal. The image forming apparatus may further include a receiver circuit 23 mounted on the carriage 5 which converts the transmission signal amplified by the amplifier circuit 22 into the image signal.

The above configuration successfully transmits the image signal over a long distance through the cable 30.

The carriage controller 27 may cause the amplifier circuit 22 to amplify the signal so as to compensate for an attenuation of the signal transmitted through the cable 30.

The above configuration successfully reduces waveform distortion of the signal that has been transmitted through the cable 30.

When the count value of the counter 26 exceeds a predetermined threshold, the carriage controller 27 may increase the gain of the amplifier circuit 22 by a predetermined value.

The above configuration successfully amplifies the signal transmitted through the cable 30 even if the attenuation characteristics of the cable 30 deteriorate in proportion to the number of times that the carriage 5 moves.

The image forming apparatus 1 may further include: a main substrate 10 on which the transceiver circuit 13 is mounted; and a carriage substrate 20 on which the counter 26, the amplifier circuit 22, and the carriage controller 27 are mounted.

The above configuration successfully and easily couples the transceiver circuit 13 to the amplifier circuit 22 by coupling the main substrate 10 to the carriage substrate 20 through the cable 30.

A method of controlling an image forming apparatus 1, which includes: a transceiver circuit 13 that transmits a signal; a carriage 5 having a recording head 21 which is movable relative to the transceiver circuit 13 and a main substrate 10 on which the transceiver circuit 13 is mounted; a counter 26 that counts how many times the carriage 5 moves; and an amplifier circuit 22 mounted on the carriage 5 which receives the signal from the transceiver circuit 13 through the cable 30 and amplifies the received signal, includes changing a gain of the amplifier circuit 22, based on a count value of the counter 26.

The above configuration successfully amplifies the signal transmitted through the cable 30 in accordance with varying attenuation characteristics of the cable 30.

What is claimed is:

1. An image forming apparatus comprising:
    a transceiver circuit configured to transmit a signal;
    a carriage having a recording head, the carriage configured to be movable;
    a counter configured to count how many times the carriage moves;
    an amplifier circuit configured to receive the signal from the transceiver circuit through a cable and amplifies the received signal,
    the amplifier circuit configured to be mounted on the carriage; and a processor configured to increase a gain of the amplifier circuit, based on a count value of the counter that exceeds a predetermined threshold.

2. The image forming apparatus according to claim 1, wherein
    the signal is an image signal,
    the transceiver circuit converts the image signal into a transmission signal, and
    the image forming apparatus further comprises a receiver circuit configured to convert the transmission signal amplified by the amplifier circuit into the image signal, the receiver circuit configured to be mounted on the carriage.

3. The image forming apparatus according to claim 1, wherein
    the processor causes the amplifier circuit to amplify the signal so as to compensate for an attenuation of the signal transmitted through the cable.

4. The image forming apparatus according to claim 1, wherein when the count value of the counter exceeds the predetermined threshold, the processor increases the gain of the amplifier circuit by a predetermined value.

5. The image forming apparatus according to claim 1, further comprising:
    a first substrate on which the transceiver circuit is mounted, and
    a second substrate on which the counter, the amplifier circuit, and the processor are mounted.

6. A method of controlling an image forming apparatus, the image forming apparatus including a transceiver circuit configured to transmit a signal,
    a carriage having a recording head, the carriage configured to be movable,
    a counter configured to count how many times the carriage moves, and an amplifier circuit configured to receive the signal from the transceiver circuit through a cable and amplifies the received signal, the amplifier circuit configured to be mounted on the carriage, the method comprising:
    increasing a gain of the amplifier circuit based on a count value of the counter that exceeds a predetermined threshold.

7. The method of controlling the image forming apparatus according to claim 6, wherein
    the image forming apparatus further includes a receiver circuit mounted on the carriage,
    the signal is an image signal,
    the transceiver circuit converts the image signal into a transmission signal, and
    the receiver circuit converts the transmission signal into the image signal.

8. The method of controlling the image forming apparatus according to claim 6, wherein
    the amplifier circuit amplifies the signal so as to compensate for an attenuation of the signal transmitted through the cable.

9. The method of controlling the image forming apparatus according to claim 6, wherein
    the changing of the gain of the amplifier circuit includes, when the count value of the counter exceeds a predetermined threshold, increasing the gain of the amplifier circuit by a predetermined value.

* * * * *